July 17, 1951     T. HIGGINS     2,560,647
EDUCATIONAL GAME DEVICE
Filed May 4, 1949     2 Sheets-Sheet 1
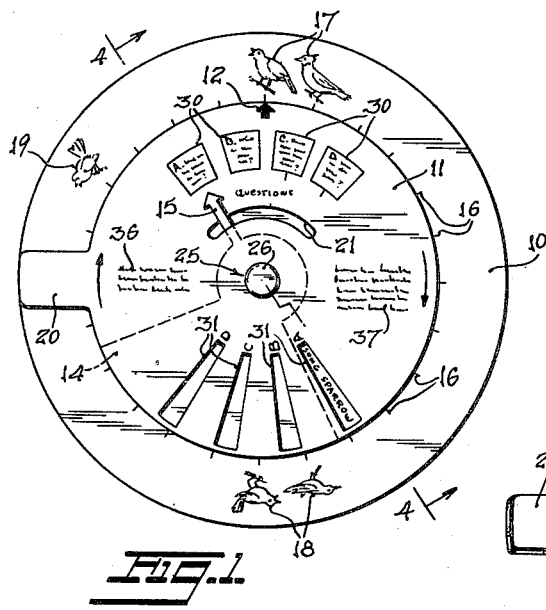
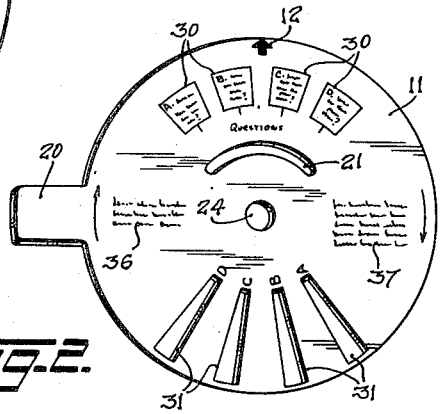
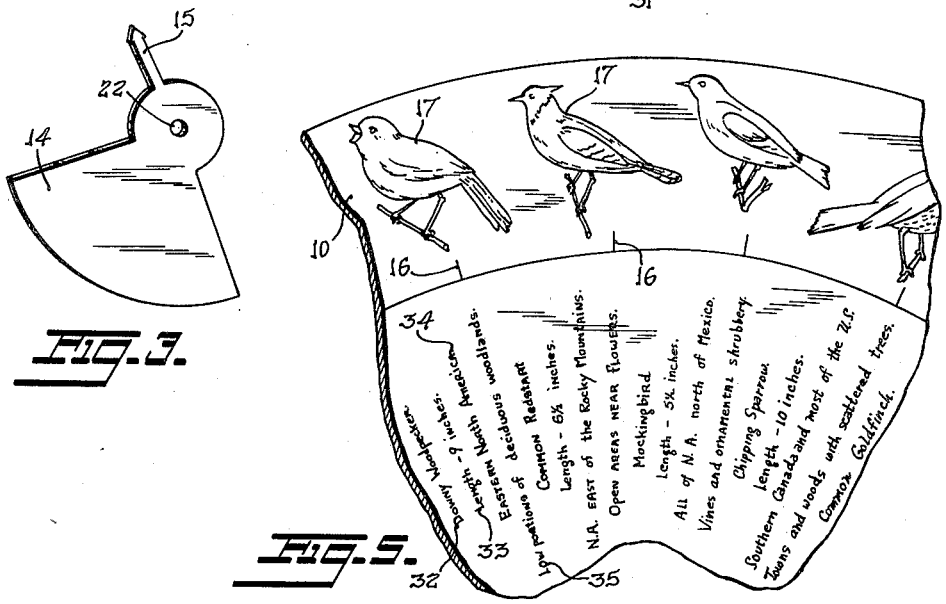
INVENTOR.
THOMAS HIGGINS
BY
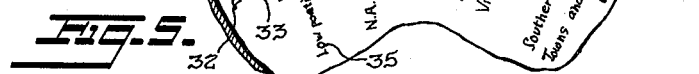
ATTORNEY July 17, 1951 T. HIGGINS 2,560,647
EDUCATIONAL GAME DEVICE
Filed May 4, 1949 2 Sheets-Sheet 2
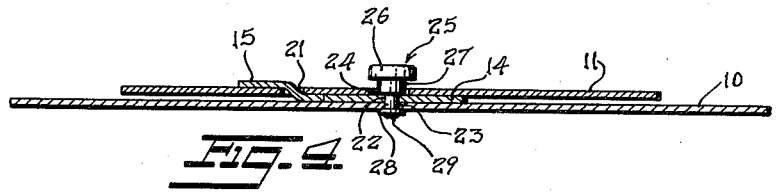
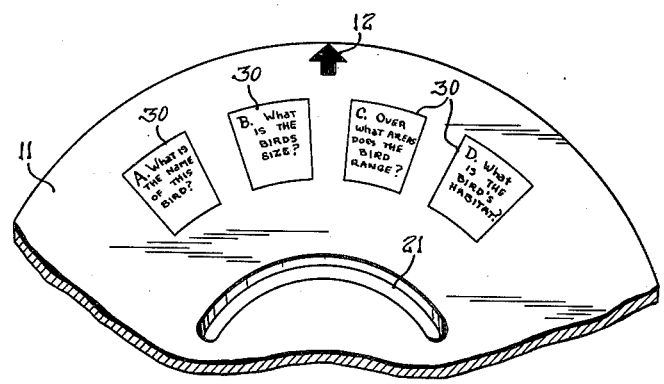
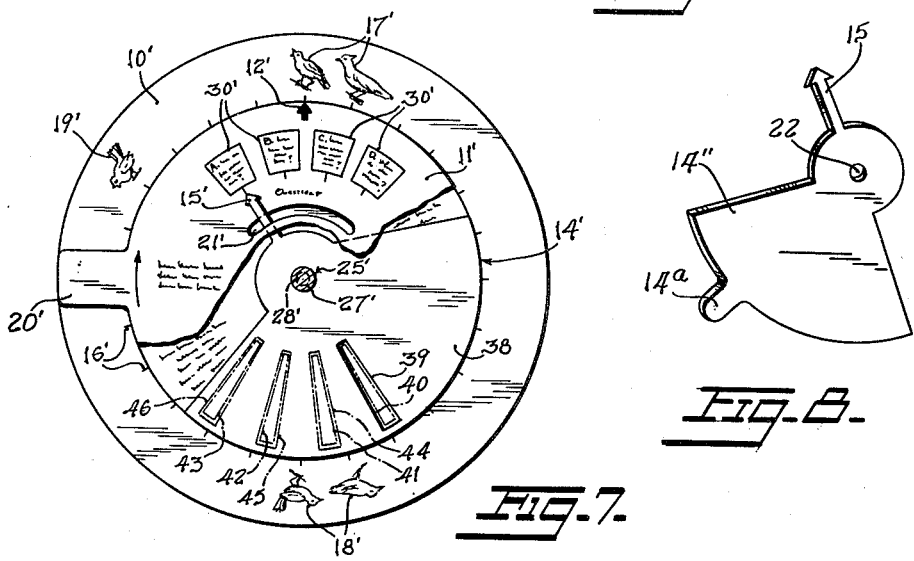
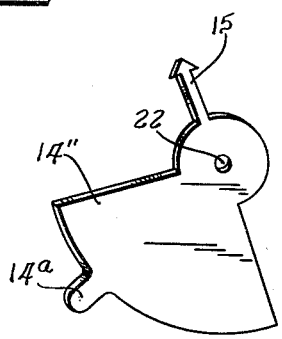
INVENTOR.
THOMAS HIGGINS
BY
ATTORNEY Patented July 17, 1951

2,560,647

UNITED STATES PATENT OFFICE 2,560,647

EDUCATIONAL GAME DEVICE

Thomas Higgins, Astoria, N. Y.

Application May 4, 1949, Serial No. 91,359

6 Claims. (Cl. 35—74)

This invention relates to new and useful improvements in educational game apparatus, and, more particularly, the aim is to provide a novel and valuable educational wheel device which while performing its educational function may constitute a source of recreation and entertainment. The educational subject matter may be substantially infinitely varied, but as the new appliance is by way of example and in accordance with present preference shown herein the same is for teaching natural history and more especially the differentiations between various birds, the regions where they are usually to be found, their habitats and the like. The present invention, with its substantially limitless variations as to the fields of knowledge to be studied, will, therefore, be described below in terms of the field of ornithology.

As is well known, a most healthful and fascinating avocation is the gradual acquirement of an intimate knowledge of our feathered friends. Many children become devotees of this fascinating pursuit, and thereby the good habit of arising early in the morning and making tours in the adjacent woodlands and countryside is developed, with, often, later membership in the Linnaean societies to be looked forward to.

According to the present invention, an educational wheel device is provided, which may be used in the home and even elsewhere; such device being characterized by the carrying thereby of a fairly large plurality of picturizations of different but related objects to be simultaneously and pictorially contrastingly displayed; by the inclusion of a manually adjustable primary index means for making any selected one of said objects temporarily the then subject of study; by the inclusion of a manually adjustable secondary index means for making any selected one of a group of questions relative to the said selected object of study the particular question to which the correct answer must then be given or noted, and for seriatim passing from one of said questions to the next in order; and by the inclusion of an auxiliary means for displaying the correct answer to check the answer orally given or to note the correct answer if such answer is not able to be orally given.

A feature of the invention, further, is that said group of questions is common to all the objects simultaneously pictorially and contrastingly displayed as above, yet the said answers are given accurately in every case regardless of which of said objects is temporarily made the subject of study by adjustment of said primary index means, and in every case also regardless of which question of said group is selected as the then asked question by adjustment of said secondary index means.

In view of what has already been said, the objects simultaneously pictorially and contrastingly displayed are different birds, these desirably shown in their typical beautiful colorations; and, while in connection with these bird picturizations, a particular group of questions, together with their appropriate answers, are illustrated as constituting a feature of the new educational device, it is to be understood that a larger or smaller group of such questions, together with their appropriate answers, then as shown here, may constitute this feature of the device, and, also, substitute questions, and/or further or supplementary questions, in any case together with their appropriate answers, may constitute this feature.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 illustrates in top plan a now favored embodiment of the educational wheel device of the invention.

Fig. 2 is a top plan view of the primary wheel of the device; this carrying the aforesaid primary index.

Fig. 3 is a top plan view of the rotatable segment, of the device; this segment carrying the aforesaid secondary index.

Fig. 4 is an enlarged section, taken on the line 4—4 of Fig. 1, and showing, below said primary wheel and said segment, the basal disk of the device.

Fig. 5 is a very much enlarged fragmentary perspective view of a portion of the upper surface of said basal disk, showing more clearly that pair of pictorial bird representations on said disk also seen near the top of Fig. 1, and also showing some of the answers to questions on the primary wheel and carried by said disk and pertaining to that pair of bird representations on said disk seen near the bottom of Fig. 1.

Fig. 6 is a view similar to Fig. 5 but relative to a portion of the upper surface of said primary wheel, for clearly showing the group of four questions to be asked in regard to any selected pictorial bird representation.

Fig. 7, illustrating a modification, is generally a view like Fig. 1, except that the primary wheel is partially broken away for clearly showing the nature of this modification, to wit, an areal modification of said segment, and a slot modification of the primary wheel.

Fig. 8 is a view similar to Fig. 3, but illustrating the rotatable segment constructed in accordance with a further modification of the invention.

The educational game device, according to the first form of the present invention shown in Figs. 1 to 6, includes a basal disk 10 and a primary wheel 11 having a primary index 12. The rotatable segment is shown at 14, and its secondary index at 15. These three main parts 10, 11 and 14 may be made of any suitable material, as a good grade of cardboard. The basal disk 10 is circular and the same carries, arranged in a circle concentric with the center of said disk, a plurality of equally spaced radial calibrations 16, these herein shown as 24 in number.

Radially offset from the outer end of each such calibration is the pictorial representation of a different bird, as partially shown in the case of the two top bird picturizations 17, the two bottom bird picturizations 18, and a fifth bird picturization 19 toward the upper left, in Fig. 1.

For rotation about said center of the basal disk 10, the primary wheel 11 is provided in front of said disk, this wheel being circular and of a diameter the same as that of the circle from which the calibrations 16 are extended. Offset from the wheel 11 is a tab 20 constituting a handle whereby said wheel may be fractionally turned as desired.

The primary wheel 11 has an arcuate slot 21 concentric with the axis of turn of said wheel, and through this slot extends the secondary index 15. This index 15 is an arrow-head-carrying elongate extension from the main segmental portion of the rotatable segment 14, and said extension, as best shown in Fig. 4, is twice bent for having its arrow-headed outer end sweepable over the surface of the primary wheel 11, between the limits defined by the ends of the slot 21, when said segment 14 is rotated about a center coinciding with the center of the wheel 11 and relative not only to said wheel but also to the basal disk 10.

These relative rotations, that of the primary wheel relative to the basal disk, and that of the segment 14 relative to the primary wheel while the latter is in any position to which it has been brought relative to said basal disk, are provided for by aperturing the segment 14 as at 22, the basal disk 10 as at 23, and the primary wheel as at 24, and by adding a handpiece in the form of a twirl-pin 25.

An operating head 26 on pin 25 may be used for turning the segment 14.

This pin has a suitably shaped head 26, as one peripherally knurled or milled; and below said head an upper larger shank portion 27 and a bottom reduced shank portion 28. The annular shoulder bottoming said shank portion 27 is suitably secured, as by an adhesive, to the upper surface of the segment 14, marginally of the aperture 22 thereof. The aperture 24 through the primary wheel 11 is slightly larger than said shank portion 27; while the shank portion 28 is of the same diameter, substantially, as the apertures 22 and 23 through respectively the segment 14 and the basal disk 10. The parts are held assembled, for the relative movements above mentioned, by any suitable attachment to the lower end of the twirl-pin 25, as by the washer and screw indicated at 29.

Carried by the upper face of the primary wheel 11 are a group 30 of four questions, each differentiated from any other by the initial use of the letter "A," "B," "C" or "D." For displaying at the proper time the correct answer to any one of these questions, regardless of which of the 24 birds is then the subject of inquiry, as determined by a rotation of the primary wheel 11 to bring its primary index 12 into registry with the particular calibration 16 pointing to the pictorial representation of that bird, four radially extending slots 31 are provided through the primary wheel 11. One of these slots is attended by the letter "A," another by the letter "B," another by the letter "C," and the other one by the letter "D."

The appropriate legends or reading matter to be read through any one of the slots 31 attended by the letter "A," "B," "C" or "D," to give the correct answer, as the case may be, to the question "A," "B," "C" or "D," and when thus read to have the said answer appropriate to the particular bird being then studied, are carried by the upper surface of the basal disk 10, within the annular space therearound lying under the 360° circular path of travel of said slots 31. Some of these legends are shown in Fig. 5; four of which are respectively marked 32, 33, 34 and 35. It will be understood that such legends are spaced, according to the arrangement here indicated, all around the entirety of said annular space. As will be understood, then, from a comparison of this Fig. 5 with Fig. 1, when the primary index 12 is brought opposite the calibration 16 offset from which is that one of the two birds pictorially represented at 18 which is to the right in Fig. 1, which bird is the downy woodpecker, and then the secondary index 15 is brought opposite the "A" question of the group 30 of four questions, there will be displayed through the "A" slot of the group of slots 31 the legend 32, "Downy woodpecker"; that when said index 15 is brought opposite the "B" question, there will be displayed through the "B" slot 31 the legend 33, "Length— 6½ inches"; that when said index is brought opposite the "C" question, there will be displayed through the "C" slot 31 the legend 34, "All of N. A. north of Mexico"; and then when said index is brought opposite the "D" question, there will be displayed through the "D" slot 31 the legend 35, "Towns and woods with scattered trees." Other legends will of course simultaneously be displayed through the three of the four slots 31 other than the one then coded by "A," "B," "C" or "D" to a particular one of the group 30 of four questions; but this coding will suffice to concentrate on reading only the appropriate one of the displayed legends.

Instructions such as those given below may be suitably imprinted on the upper surface of the primary wheel 11, as indicated at 36 and 37.

Where, as it may be found desirable, it is preferred to avoid the display of legends through the three slots 31 other than that particular one of said slots which is "A," "B," "C" or "D" coded to a question then being asked, the modification of Fig. 7 may accomplish this. In the construction here shown, the parts to which are applied reference numerals with primes added correspond, respectively, to the parts to which have been applied the same reference numerals but without primes. This construction is exactly like that of Figs. 1–6, except that the rotatable segment 14 has its segment-shaped main portion 38 of considerably greater arcuate length than the corresponding portion of the segment 14; except that, while the primary wheel 11' has four slots similar to and spaced as are the four slots of the wheel 11; and except that the segment 14 has a single radial slot 39. In any of the four positions of the segment 14, with its index 15' at a different one of the four questions 30', the slot 39 of said segment registers with a different one of the four slots of the primary wheel 11'. The radially extended subdivisions of the upper surface of the basal disk 10' which carry legends corresponding to those typified at 32, 33, 34 and 35 in Fig. 5 are indicated in Fig. 7 at, respectively, 40, 41, 42, and 43; while the three possible relocations of the slot 39 are indicated at, respectively, 44, 45 and 46.

The parts are so arranged that said slot is positioned as shown in full lines when the secondary index 15' is at the "A" one of the questions 30', thus to cause the display, and only the display of the appropriate answer; that said slot is relocated at 41 when said index 15' is at the "B" question; that said slot is relocated at 42 when said index is at the "C" question; and that said slot is relocated at 43 when said index is at the "D" question. In all of these three last-mentioned cases, also, there will be displayed, and only displayed, the appropriate answer. And this is all true regardless of to which bird picturation the primary index 12' has been first brought.

The preferred method of use of the device is as follows:

By aid of the tab 20 (or 20'), turn the primary wheel in a clockwise direction until the primary index 12 (or 12') points precisely to the calibration 16 offset from which is the picturization of the bird desired to be studied. Then to test the knowledge of the user of the device, he or she may try to answer the four "A," "B," "C" and "D" questions relative to that bird. If the answers are not known and so must be ascertained, or it is desired to check the purposed answers, this may be done by employing the twirl-pin 25 with the right hand while meanwhile holding with the left hand the tab 20 (or 20'). As the secondary index 15 (or 15') is seriatim pointed to each question, the slot at the corresponding letter "A," "B," "C" or "D" will display the correct answer. When all the four answers have been obtained, in regard to a particular bird, the secondary index is returned to the extreme left; and then the primary wheel 11 (or 11') is turned one more step in the clockwise direction, to make the next bird the subject of study. This primary wheel should always be turned in a clockwise direction.

In the modification of the rotatable segment 14'' shown in Fig. 8, there is a tab 14ª extending radially from that segment by which it can be rotated.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An educational wheel device, comprising a basal disk, a primary wheel in front of but smaller than said basal disk, a segment interposed between said wheel and disk, a means for revolubly mounting the wheel on the disk and also for rotatively mounting the segment on the disk, a finger-piece means carried by the wheel for facilitating manual revolving of the same relative to the disk, a finger-piece means carried by said mounting means and fixed relative to the segment and projected upwardly above the wheel for facilitating manual rotation of the segment relative to the wheel in any position of the latter relative to the disk, a plurality of pictorial representations carried by the upper surface of the disk and spaced therearound where the disk is projected beyond the wheel, each of said representations being different but each graphically picturizing a different member of a related group of objects to be studied, a primary index visibly carried by the wheel and disposable on rotation of the wheel opposite any particular selected one of said representations, a group of questions carried by the upper surface of the wheel, said questions common to all of said representations, a secondary index carried by the segment and arranged for travel over the upper surface of the wheel for disposition on rotation of the segment relative to the wheel opposite any particular selected one of said questions, a series of legends constituting accurate answers to all of said questions as applied to any of said representations, said legends arranged substantially radially around an annular subdivision of the upper surface of the disk the outer limit of which is defined by the periphery of the wheel, said wheel being substantially radially slotted with such slotting arranged for the display therethrough of the appropriate one of said legends according as said primary index is then opposite a particular one of said representations and according as said secondary index is then opposite a particular one of said questions, said segment being of such extent to cover said legends aligned with the radial slots and arranged to move clear of said legends successively as said secondary index is moved from question to question to expose the proper legend through the proper radial slot.

2. An educational wheel device, comprising a basal disk, a primary wheel in front of but smaller than said basal disk, a segment interposed between said wheel and disk, a means for revolubly mounting the wheel on the disk and also for rotatively mounting the segment on the disk, a finger-piece means carried by the wheel for facilitating manual revolving of the same relative to the disk, a finger-piece means carried by said mounting means and fixed relative to the segment and projected upwardly above the wheel for facilitating manual rotation of the segment relative to the wheel in any position of the latter relative to the disk, a plurality of pictorial representations carried by the upper surface of the disk and spaced therearound where the disk is projected beyond the wheel, each of said representations being different but each graphically picturizing a different member of a related group of objects to be studied, a primary index visibly carried by the wheel and disposable on rotation of the wheel opposite any particular selected one of said representations, a group of questions carried by the upper surface of the wheel, said questions common to all of said representations, a secondary index carried by the segment and arranged for travel over the upper surface of the wheel for disposition on rotation of the segment relative to the wheel opposite any particular selected one of said questions, a series of legends constituting accurate answers to all of said questions as applied to any of said representations, said legends arranged substantially radially around an annular subdivision of the upper surface of the disk the outer limit of which is defined by the periphery of the wheel, said wheel being substantially radially slotted with such slotting arranged for the display therethrough of the appropriate one of said legends according as said primary index is then opposite a particular one of said representations and according as said secondary index is then opposite a particular one of said questions, said segment being of such extent to cover said legends aligned with the radial slots and arranged to move clear of said legends successively as said secondary index is moved from question to question to expose the proper legend through the proper radial slot, said questions being attended by identifying indicia, each such indicium being different in the case of a different question, said slotting of the wheel being in the from of a plurality of generally radially extending slots equal in number to the number of questions, and each such slots being attended by an identifying indicium coding that slot to a particular question.

3. An educational wheel device, comprising a basal disk, a primary wheel in front of but smaller than said basal disk, a segment interposed between said wheel and disk, a means for revolubly mounting the wheel on the disk and also for rotatively mounting the segment on the disk, a finger-piece means carried by the wheel for facilitating manual revolving of the same relative to the disk, a finger-piece means carried by said mounting means and fixed relative to the segment and projected upwardly above the wheel for facilitating manual rotation of the segment relative to the wheel in any position of the latter relative to the disk, a plurality of pictorial representations carried by the upper surface of the disk and spaced therearound where the disk is projected beyond the wheel, each of said representations being different but each graphically picturizing a different member of a related group of objects to be studied, a primary index visibly carried by the wheel and disposable on rotation of the wheel opposite any particular selected one of said representations, a group of questions carried by the upper surface of the wheel, said questions common to all of said representations, a secondary index carried by the segment and arranged for travel over the upper surface of the wheel for disposition on rotation of the segment relative to the wheel opposite any particular selected one of said questions, a series of legends constituting accurate answers to all of said questions as applied to any of said representations, said legends arranged substantially radially around an annular subdivision of the upper surface of the disk the outer limit of which is defined by the periphery of the wheel, said wheel being substantially radially slotted with such slotting arranged for the display therethrough of the appropriate one of said legends according as said primary index is then opposite a particular one of said representations and according as said secondary index is then opposite a particular one of said questions, said segment being of such extent to cover said legends aligned with the radial slots and arranged to move clear of said legends successively as said secondary index is moved from question to question to expose the proper legend through the proper radial slot, the first-named finger-piece means being a tab offset from the general circularity of the wheel.

4. An educational wheel device, comprising a basal disk, a primary wheel in front of but smaller than said basal disk, a segment interposed between said wheel and disk, a means for revolubly mounting the wheel on the disk and also for rotatively mounting the segment on the disk, a finger-piece means carried by the wheel for facilitating manual revolving of the same relative to the disk, a finger-piece means carried by said mounting means and fixed relative to the segment and projected upwardly above the wheel for facilitating manual rotation of the segment relative to the wheel in any position of the latter relative to the disk, a plurality of pictorial representations carried by the upper surface of the disk and spaced therearound where the disk is projected beyond the wheel, each of said representations being different but each graphically picturizing a different member of a related group of objects to be studied, a primary index visibly carried by the wheel and disposable on rotation of the wheel opposite any particular selected one of said representations, a group of questions carried by the upper surface of the wheel, said questions common to all of said representations, a secondary index carried by the segment and arranged for travel over the upper surface of the wheel for disposition on rotation of the segment relative to the wheel opposite any particular selected one of said questions, a series of legends constituting accurate answers to all of said questions as applied to any of said representations, said legends arranged substantially radially around an annular subdivision of the upper surface of the disk the outer limit of which is defined by the periphery of the wheel, said wheel being substantially radially slotted with such slotting arranged for the display therethrough of the appropriate one of said legends according as said primary index is then opposite a particular one of said representations and according as said secondary index is then opposite a particular one of said questions, said segment being of such extent to cover said legends aligned with the radial slots and arranged to move clear of said legends successively as said secondary index is moved from question to question to expose the proper legend through the proper radial slot, the first-named finger-piece means being a tab offset from the general circularity of the wheel, said mounting means incorporating a headed twirl-pin the head of which constitutes the second-named finger-piece, said twirl-pin also incorporating an upper larger shank portion and a lower smaller shank portion, the wheel having a central aperture loosely surrounding said upper shank portion, the segment and the disk having matching apertures surrounding said lower shank portion, and said upper shank portion being secured to the segment.

5. An educational wheel device, comprising a basal disk, a primary wheel in front of but smaller than said basal disk, a segment interposed between said wheel and disk, a means for revolubly mounting the wheel on the disk and also for rotatively mounting the segment on the disk, a finger-piece means carried by the wheel for facilitating manual revolving of the same relative to the disk, a finger-piece means carried by said mounting means and fixed relative to the segment and projected upwardly above the wheel for facilitating manual rotation of the segment relative to the wheel in any position of the latter relative to the disk, a plurality of pictorial representations carried by the upper surface of the disk and spaced therearound where the disk is projected beyond the wheel, each of said representations being different but each graphically picturizing a different member of a related group of objects to be studied, a primary index visibly carried by the wheel and disposable on rotation of the wheel opposite any particular selected one of said representations, a group of questions carried by the upper surface of the wheel, said questions common to all of said representations, a secondary index carried by the segment and arranged for travel over the upper surface of the wheel for disposition on rotation of the segment relative to the wheel opposite any particular selected one of said questions, a series of legends constituting accurate answers to all of said questions as applied to any of said representations, said legends arranged substantially radially around an annular subdivision of the upper surface of the disk the outer limit of which is defined by the periphery of the wheel, said wheel being substantially radially slotted with such slotting arranged for the display therethrough of the appropriate one of said legends according as said primary index is then opposite a particular one of said representations and according as said secondary index is then opposite a particular one of said questions, said segment being of such extent to cover said legends aligned with the radial slots and arranged to move clear of said legends successively as said secondary index is moved from question to question to expose the proper legend through the proper radial slot, the first-named finger-piece means being a tab offset from the general circularity of the wheel, said mounting means incorporating a headed twirl-pin the head of which constitutes the second-named finger-piece, said twirl-pin also incorporating an upper larger shank portion and a lower smaller shank portion, the wheel having a central aperture loosely surrounding said upper shank portion, the segment and the disk having matching apertures surrounding said lower shank portion, and said upper shank portion being secured to the segment, the wheel having an arcuate slot concentric with the axis of said mounting means, and the said secondary index being in the form of an elongate extension from the segment extended through said arcuate slot.

6. An educational wheel device, comprising a basal disk, a primary wheel in front of but smaller than said basal disk, a segment interposed between said wheel and disk, a means for revolubly mounting the wheel on the disk and also for rotatively mounting the segment on the disk, a finger-piece means carried by the wheel for facilitating manual revolving of the same relative to the disk, a finger-piece means carried by said mounting means and fixed relative to the segment and projected upwardly above the wheel for facilitating manual rotation of the segment relative to the wheel in any position of the latter relative to the disk, a plurality of pictorial representations carried by the upper surface of the disk and spaced therearound where the disk is projected beyond the wheel, each of said representations being different but each graphically picturizing a different member of a related group of objects to be studied, a primary index visibly carried by the wheel and disposable on rotation of the wheel opposite any particular selected one of said representations, a group of questions carried by the upper surface of the wheel, said questions common to all of said representations, a secondary index carried by the segment and arranged for travel over the upper surface of the wheel for disposition on rotation of the segment relative to the wheel opposite any particular selected one of said questions, a series of legends constituting accurate answers to all of said questions as applied to any of said representations, said legends arranged substantially radially around an annular subdivision of the upper surface of the disk the outer limit of which is defined by the periphery of the wheel, said wheel being substantially radially slotted with such slotting arranged for the display therethrough of the appropriate one of said legends according as said primary index is then opposite a particular one of said representations and according as said secondary index is then opposite a particular one of said questions, said slotting of the wheel being in the form of a plurality of generally radially extending slots equal in number to the number of questions, the segment also having a generally radially extending slot, the parts being so arranged that the last-named slot registers with a different one of the plurality of the radial slots of the wheel according as said secondary index is opposite a different one of said questions.

THOMAS HIGGINS.

REFERENCES CITED

The following references are of record in the file of this patent:

UNITED STATES PATENTS

| Number | Name | Date |
|---|---|---|
| 1,676,410 | Paul | July 10, 1928 |
| 1,816,760 | Barnowitz | July 28, 1931 |
| 1,966,971 | Rochlus | July 17, 1934 |
| 2,234,896 | De Turk | Mar. 11, 1941 |
| 2,406,495 | Grand-Jean | Aug. 27, 1946 |
| 2,469,389 | Hellman et al. | May 10, 1949 |